(12) United States Patent
Sorrentino et al.

(10) Patent No.: US 8,382,975 B2
(45) Date of Patent: Feb. 26, 2013

(54) PROCESS FOR MONITORING THE CURING REACTION OF A POLYMERIC MATRIX OF A COMPOSITE MATERIAL

(75) Inventors: Andrea Sorrentino, Palma Campania (IT); Heinrich Christoph Neitzert, Turin (IT); Luigi Vertuccio, Teggiano (IT); Liberata Guadagno, Fisciano (IT); Vittoria Vittoria, Naples (IT); Generoso Iannuzzo, Avellino (IT); Salvatore Russo, Quarto (IT); Erika Calvi, Montoro Superiore (IT)

(73) Assignee: Alenia Aeronautica S.p.A., Pomigliano D'Arco, Naples (IT)

( * ) Notice: Subject to any disclaimer, the term of this patent is extended or adjusted under 35 U.S.C. 154(b) by 453 days.

(21) Appl. No.: 12/615,161

(22) Filed: Nov. 9, 2009

(65) Prior Publication Data

US 2010/0117665 A1    May 13, 2010

(30) Foreign Application Priority Data

Nov. 10, 2008 (IT) .............................. TO2008A0826

(51) Int. Cl.
*B32B 37/14* (2006.01)
(52) U.S. Cl. .................. 205/793.5; 205/790.5; 156/378
(58) Field of Classification Search ............... 205/790.5, 205/793.5; 156/378, 379.6, 380.2, 380.3; 977/847
See application file for complete search history.

(56) References Cited

U.S. PATENT DOCUMENTS

| 2003/0134987 | A1 | 7/2003 | Jang et al. | |
| 2006/0057053 | A1* | 3/2006 | Otobe et al. | 423/447.2 |

OTHER PUBLICATIONS

European Search Report for corresponding European application No. 0917539534.
Xie et al. "Cure kinetics of carbon nanotube/tetrafunctional epoxy nanocomposites by isothermal differential scanning calorimetry." *Journal of Polymer Science*. vol. 42, No. 20, Oct. 15, 2004, pp. 3701-3712.
Todoroki "Electric resistance change method for cure/strain/damage monitoring of CFRP laminates." *Key Engineering Materials—Advances in Nondestructive Evaluation*. vol. 270-273, No. III, Nov. 3, 2003, pp. 1812-1820. Abstract Only.
Lee et al. "Cure monitoring and stress-strain sensing of single-carbon fiber composites by the measurement of electrical resistance." *Key Engineering Materials*, vol. 297-300, 2005, pp. 676-682. Abstract Only.
Park et al. "Cure monitoring and residual stress sensing of single-carbon fiber reinforced epoxy composites using electrical resistivity measurement." *Composites Science and Technology*. vol. 36, No. 3-4, Mar. 1, 2005, pp. 571-580.

* cited by examiner

*Primary Examiner* — J. Christopher Ball
(74) *Attorney, Agent, or Firm* — Merchant & Gould P.C.

(57) ABSTRACT

The process for monitoring the curing reaction of a polymeric matrix, in which carbon nanotubes are dispersed whereby a composite material is formed, provides for:
  arranging an electric circuit comprising at least a generator of a substantially constant voltage, an amperemeter and two electrodes immersed into the composite material, whereby the composite material interposed between the electrodes closes the electrical circuit, and
  tracing the current intensity value measured by the amperemeter, which is correlated to the progress of the curing reaction of the polymeric matrix, so as to control said progress.

11 Claims, 2 Drawing Sheets

Figure 1:
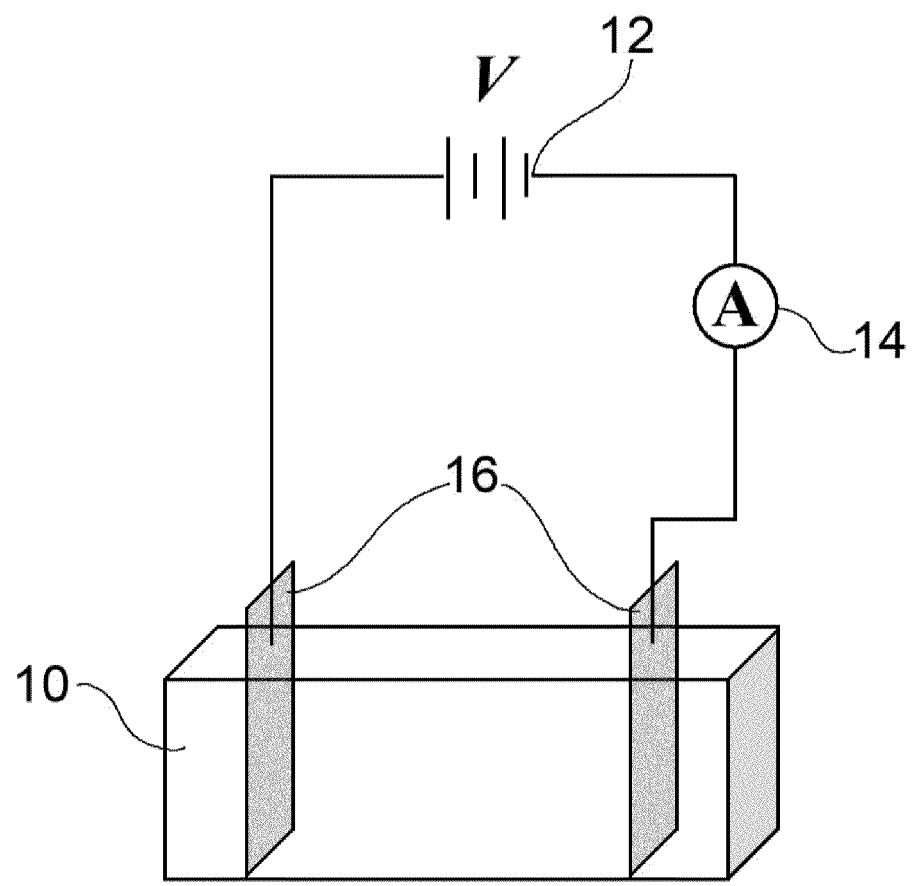

PROCESS FOR MONITORING THE CURING REACTION OF A POLYMERIC MATRIX OF A COMPOSITE MATERIAL

The present invention relates in general to the field of monitoring the production process of composite materials with a polymeric matrix.

Such materials, thanks to the very interesting mechanical properties thereof, are applied in an increasing number of different fields. In particular, they are becoming essential for aerospace, automotive, nautical and in general, infrastructural applications.

The advantages of this type of material include the high mechanical resistance/weight ratio, the good fatigue resistance, the excellent corrosion resistance and the high flexibility for different types of application.

Also, obtaining optimum properties highly depends on the conditions of the production process. Composite materials with a polymeric matrix, in fact, are generally obtained using a quite complex combination of time, temperature and pressure. These conditions transform the polymeric resin in a solid and stiff material through a complex series of chemical reactions. In the technical terminology such transformation, that typically causes a hardening and a cross-linking, is defined as "curing".

Many times, however, the variations of the properties of raw materials, as well as the ageing of components, may alter the optimum curing conditions. The only possibility of increasing the quality and consistency of the results obtained with these types of materials is to develop a sensor system for the continuous monitoring of the chemical and physical variations during the curing process. Controlling the transformation process of these materials based upon the current material state, rather than on the use of the conditions recommended by the manufacturer, it is in fact possible to obtain controlled properties.

This type of approach is particularly useful also in the production and in the application of repairs and/or structural reinforcements on damaged or aged materials.

Several techniques are currently available for obtaining systems capable of monitoring the curing reaction. They may be classified based on the type of properties monitored that, in particular, may be electrical, thermal, acoustic, optical or indirect ones.

The electrical properties that may be monitored include capacity, conductance, dielectric constant and the dielectric load factor of the material. These techniques require the use of sensors which are placed inside or onto the workpiece to be made. In both cases, the use of these types of sensors in the presence of electrically conductive fibres (such as for example carbon fibres), requires an accurate shielding due to the unavoidable electrical interferences. Moreover, it has been found that while the minimum viscosity point and that of complete curing may be easily identified, the conversion degree during the curing cannot be obtained in a simple manner. These techniques therefore are not capable of tracing the curing process and therefore permitting the control thereof in an efficient manner.

The thermal sensors or the thermocouples are the simplest system for monitoring the curing. They ensure that the material has been at the right temperature for the time required and that the fixed cycle has actually been carried out. In any case, except for the exothermic processes, their advantage as curing sensors is quite limited.

Acoustic techniques may relate to both the use of the propagation of ultrasound waves, and the use of sound emissions. Ultrasound measures may be related to parameters such as curing degree, porosity, viscosity, delamination and volume fraction of fibres. On the other hand, sound emissions allow monitoring the cooling step of the material and checking the forming of cracks due to thermal stresses. Problems may arise when these parameters change simultaneously as it is not possible to make a distinction between them.

The object of the present invention is to provide a monitoring process free from the above-mentioned disadvantages of the prior art.

Such object is achieved by a process for monitoring the curing reaction of a polymeric matrix, in which carbon nanotubes are dispersed whereby a composite material is formed, said process providing for:

arranging an electric circuit comprising at least a generator of a substantially constant voltage, an amperemeter and two electrodes embedded into the composite material, whereby the composite material interposed between said electrodes closes the electrical circuit, and tracing the value of the current intensity measured by the amperemeter, which is correlated to the progress of the curing reaction of the polymeric matrix, so as to control said progress.

A critical element in the process of the invention is the presence of carbon nanotubes in the polymeric matrix. Such term typically denotes an inorganic solid essentially formed by one or more graphite layers wound on themselves with a diameter comprised between 1 and 50 nm and a length to diameter ratio equal to or higher than 100. If the nanotube is formed by a single graphite layer it is defined single wall carbon nanotube SWNT, whereas if it is formed by a plurality of graphite layers it is defined multi wall carbon nanotube MWNT. The structural organisation of the carbon atoms provides the carbon nanotube with several excellent physical properties, such as an electrical conductivity similar to that of copper or gold, a thermal conductivity in the direction of the major axis better than any other material, and a higher mechanical resistance than any other material. Carbon nanotubes may be treated superficially, oxidised, purified or functionalised with organic molecules to improve the dispersion thereof in the selected polymeric matrix.

Carbon nanotubes may be evenly distributed in the entire mass of material to be monitored or applied to some selected points, so as to form a conductive network in the polymeric matrix.

The nanotube dispersion in the matrix is obtained at room temperature, directly in the matrix precursors, stirring vigorously, by hand or by any other mechanical instrument, up to obtain a homogeneous product.

In particular, carbon nanotubes are dispersed so as to form a conductive network, which moreover limits the sliding of the polymeric chains so as to increase the mechanical properties of the resulting composite material, and limits the spreading of gases or vapours inside the latter, thus increasing the thermal conductivity.

Advantageously, carbon nanotubes are present in the composite material in the amount of 0.01-10% by weight, preferably of 0.1-3% by weight and even more preferably of 0.01-0.5% by weight.

The polymeric matrix may be formed, as a general rule, by any monomer, oligomer, polymer o mixtures of the above susceptible of being subjected to a curing process.

In the specific case of materials for aerospace, automotive, nautical and in general, infrastructural applications, thermosetting materials capable of withstanding high thermal and mechanical stresses are applied. In particular, also epoxy resins, phenol resins, amide resins, polyurethane resins, unsaturated polyester resins, silicone resins and alkyd resins may be used as thermosetting polymers. As regards, in particular, epoxy resins it is possible to envisage the use of a) phenol-glycidyl ethers, b) glycidylamines c) cycloaliphatic resins, d) multifunctional resins, such as for example bisphenol A diglycidylether (DGEBA), bisphenol F diglycidylether (DGEBF), polyglycidylether of phenol-formaldehyde novolac, polyglycidylether of o-cresol-formaldehyde novolac, N,N,N',N',-tetraglycidyl methylene dianiline, bisphenol-A novolac, trisphenol-methane triglycidylether, triglycidyl p-aminophenol, 3,4 epoxycyclohexylmethyl-3,4-epoxycyclohexane carboxylate, etc.

For polymeric matrixes consisting of epoxy resins, the low molecular weight oligomer is preferably used as a starting material, and then cross-linking agents (or curing agents) are added to the precursors of the liquid epoxy resin. Curing agents usable for the resin hardening process may be a) primary and secondary polyamines and adducts thereof, b) polyamides, c) anhydrides, d) catalytic species that are not active cross-linking agents, but trigger or accelerate the resin cross-linking process.

Non-limiting examples of type a) cross-linking agents are: aliphatic amines such as for example diethylenetriamine, triethylenetetramine, tetraethylenepentamine, dimethylaminopropylamine, N-aminoethylpiperazine, or aromatic amines (when good mechanical performances at a high temperature are required) such as for example metaphenylenediamine, diaminodiphenylsulfone, diethyltoluenediamine.

Non-limiting examples of type b) cross-linking agents are commercial products of the type Epicure 3125, Epicure 3140, Epicure 3155, Epicure 3192 (or mixtures of such products) or Versamid 100 and Ancamide 100, Versamid 115 and Ancamide 220, Versamid 125 and Ancamide 260 A.

Non-limiting examples of type c) cross-linking agents are: phthalic anhydride, bicyclo[2.2.1]-5-eptano-2,3 dicarboxylic anhydride, methyl tetrahydrophthalic anhydride.

Non-limiting examples of type d) cross-linking agents are: 2,4,6-tris(dimethylamminomethyl)phenol, triethylenediamine, N,N-dimethylpiperidine, benzyldimethylamine, 2-(dimethylaminomethyl)phenol.

In the preparation step of the mixture, a flexibilizing agent and/or a reactive diluent may be added to the epoxy resin precursors in amounts indicatively variable from 5 to 40 parts by weight by 100 parts by weight of epoxy polymer precursor. Esters or ethers having long aliphatic chains and including epoxy groups in the structure may also be used as "flexibilizing agent" and/or reactive diluent.

Advantageously, the composite material is made of the polymeric matrix in an amount equal to 50-99% preferably 60-99% more preferably 90-99% and even more preferably 95-99% w/w.

In the embodiment of the process of the invention, the electrical signal produced by the amperemeter may be recorded in real time and presented as such or in graphical form or in form of an optical or acoustical signal.

The monitoring process of the invention may be used in a variety of technological machining processes, such as for example compression moulding, injection moulding, thermoforming, resin transfer molding, hand lay-up, wet lay-up, pressure bag molding, vacuum bag molding, blading, bagging, open molding, pultrusion, filament winding, etc., to make articles in liquid, solid or semisolid form, such as for example films, pipes, panels, closures, multilayer articles, structural pieces, etc., and mono- or multilayer coatings.

Figure 2:
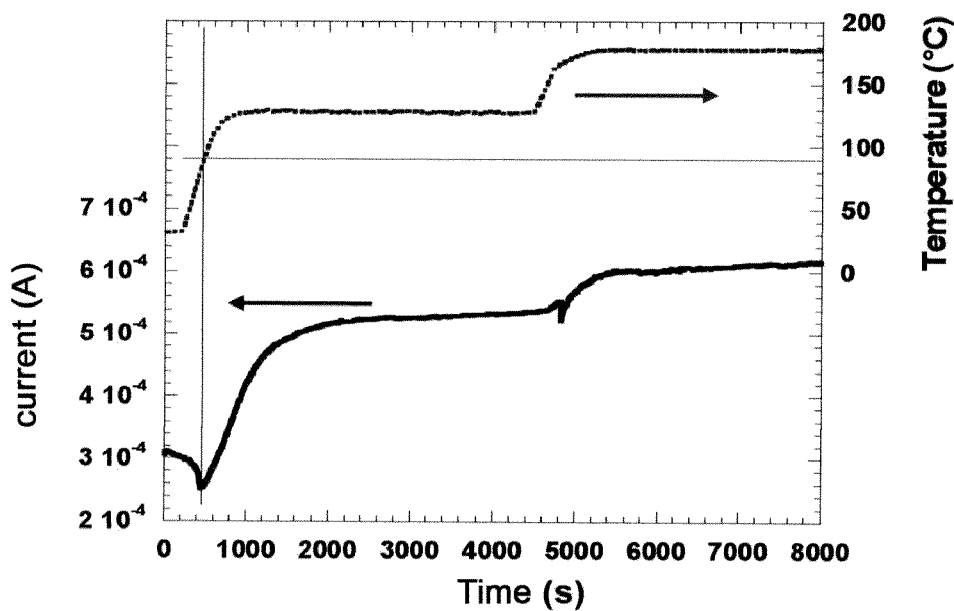
Figure 3:
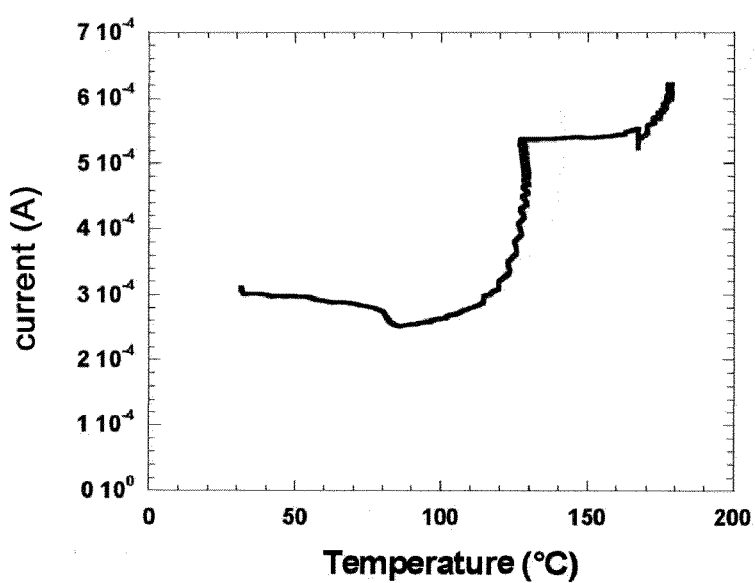

An example of embodiment of the invention shall now be given by way of a non-limiting example with reference to the attached drawings, wherein:

FIG. 1 shows a diagram of an electrical circuit associated to a composite material subject to the monitoring process of the invention, FIG. 2 shows a diagram that shows the evolution of temperature and current during a curing cycle, and FIG. 3 shows a diagram that shows the evolution of the current intensity value as a function of the temperature during a curing cycle.

EXAMPLE

This example relates to the control of the production process of a composite material formed by an epoxy matrix wherein carbon nanotubes are dispersed.

A mixture based on bisphenol-A diglycidyl-ether (DGEBA) supplied by Sigma-Aldrich was used as a starting material to make the polymeric matrix.

DGEBA is formed through a condensation reaction between epichlorohydrin and bisphenol-A, catalysed by a base (NaOH). The reaction is conducted with an excess of epichlorohydrin so as to limit the production of products with a high molecular weight.

A resin was obtained, with an average molecular weight of about 370 g/mol, equivalent epoxy weight (EEW) of 180-200, viscosity at 25° C. of 1000-1800 Pa*s and density of 969 kg/m$^3$.

Afterwards, the resin was first heated between 50 and 80° C. and then degassed for 45 minutes at 70° C. in a vacuum stove. 0.5% of carbon nanotubes were then incorporated in the resin by sonication for 20 minutes. The nanotubes were "multi-walled" non functionalised type (Nanocyl®-3100) produced via "catalytic carbon vapor deposition" (ccvd) by NANOCYL S.A. Rue de l'Essor, 4 B-5060 Sambreville, Belgium. Such nanotubes had previously been purified up to obtain a carbon percentage higher than 95%.

Di(4-aminophenyl)sulfone (DDS) was added to the resulting mixture as hardening agent, in stoichiometric quantity, calculated on the equivalent weight of the epoxide. Then, this was mixed by magnetically stirring (400 rpm) for about one hour in order to obtain a homogeneous solution.

A sample 10 of the latter, shaped as a parallelepiped with dimensions 35×10×3 mm (see FIG. 1) was associated to an electrical circuit comprising a constant voltage generator 12, generating a voltage of 10 V, an amperemeter 14 of the "Keithley 2400" type and two copper electrodes 16 immersed in the solution, so that the solution arranged between them closed the electrical circuit.

Sample 10 was then put in a stove and subject to a complete curing cycle consisting in a heating from room temperature to 130° C. with a heating rate equal to 10° C./min, an isothermal period at 130° C. for 60 minutes, a subsequent heating up to 180° C. always at the rate of 10° C./min, a further isothermal period at 180° C. for 60 minutes and finally a cooling in air from 180° C. to room temperature.

The current intensity value measured by the amperemeter during the various steps of such a curing cycle is shown in FIGS. 2 and 3 based on time and temperature, respectively. During the first heating step, when the system still has a nil curing degree, the current intensity value varies linearly. At about 80° C., temperature corresponding to the glass transition point or to the minimum viscosity point of the system, the current intensity shows a clear minimum (FIG. 2). Probably, at this temperature the high molecular agitation affects the conductive network of the carbon nanotubes, negatively affecting the electrical properties of the composite. The "curing" reaction starts immediately after this step, reflected by the increase of the current intensity value. During the isothermal step, the current intensity value depends only on the curing degree, since any thermal effects are to be excluded at constant temperature. In this step, the increase of the current intensity value probably is to be ascribed to the volumetric contraction of the system due to the continuous increase of the reticulation degree. Once the latter has been completed, the current intensity value depends only on the temperature variation, as it can be seen from the results obtained during the cooling step of the completely cured composite.

Following the description above it is clear that the various steps in the curing cycle are reflected by the current intensity value, so as by measuring the latter it is possible to keep the hardening process under strict control, carrying out the necessary corrective measures, if required.

Of course, the principle of the invention being understood, the manufacturing details and the embodiments may widely vary compared to what described by way of an example only, without departing from the scope of the claims. In particular, based on the type of application required, it is possible to choose parameters such as type and functionalisation of the carbon nanotubes, type of polymeric matrix (homopolymers, copolymers, mixtures), concentration and dispersion of carbon nanotubes in the polymeric matrix, porosity degree of the material, presence of further components such as glass fibres and carbon fibres, etc., in an optimal manner.

What is claimed is:

1. Process for monitoring the curing reaction of a polymeric matrix, in which carbon nanotubes are dispersed to form a composite material, said process comprising:

arranging an electric circuit comprising at least a generator of a substantially constant voltage, an amperemeter and two electrodes immersed into the composite material, wherein the composite material interposed between said electrodes closes the electrical circuit, and tracing a current intensity value measured by the amperemeter, which is correlated to the progress of the curing reaction of the polymeric matrix, so as to control said progress; wherein said composite material is formed 0.01-0.5% w/w by said carbon nanotubes, the nanotubes being applied only to selected points of the polymeric matrix.

2. Process according to claim 1, wherein the electrical signal produced by said amperemeter is recorded in time and presented as such or in graphical form or of optical or acoustical signal.

3. Process according to claim 1, wherein said composite material is formed 50-99% w/w, by the polymeric matrix.

4. Process according to claim 1, wherein said polymeric matrix comprises any monomer, oligomer, polymer o mixtures thereof susceptible of being subjected to a curing process.

5. Process according to claim 1, wherein said polymeric matrix comprises one or more polymers chosen in the group consisting of epoxy resins, phenol resins, amide resins, polyurethane resins, unsaturated polyester resins, silicone resins and alkyd resins.

6. Process according to claim 1, wherein said carbon nanotubes are chosen among single-wall, multiple-wall, chiral, zig-zag, armchair, oxidized and purified ones.

7. Process according to claim 1, wherein said nanotubes are provided of an organic coating which improves the dispersion and/or adhesion thereof with the polymeric matrix.

8. Process according to claim 1, wherein said composite material further comprises reinforcement materials, such as glass fibres and carbon fibres.

9. Process according to claim 1, wherein said composite material is formed 60-99% by the polymeric matrix.

10. Process according to claim 1, wherein said composite material is formed 90-99% by the polymeric matrix.

11. Process according to claim 1, wherein said composite material is formed 95-99% w/w by the polymeric matrix.

* * * * *